Nov. 10, 1953   J. R. MILES   2,658,422
OPTICAL SYSTEM FOR BINOCULAR VIEWING DEVICES
Filed Sept. 10, 1949
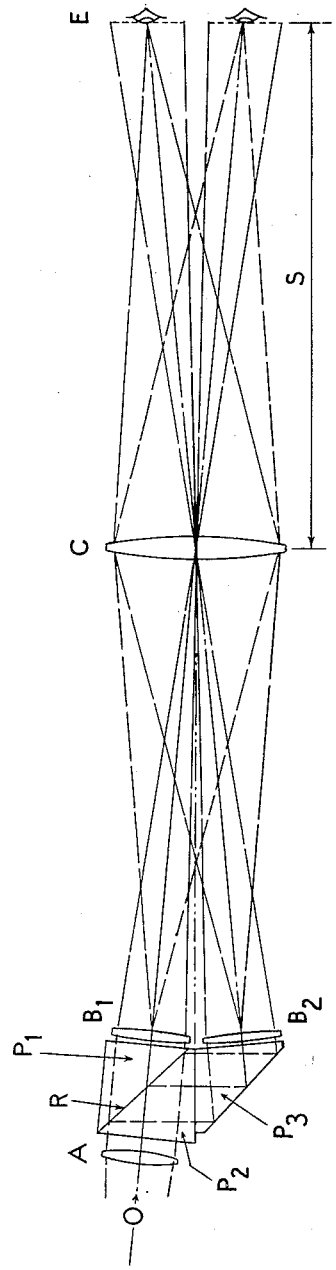
John R. Miles
INVENTOR.
BY
Wilkinson, Huxley, Byron, & Hume Patented Nov. 10, 1953

2,658,422

UNITED STATES PATENT OFFICE 2,658,422

OPTICAL SYSTEM FOR BINOCULAR VIEWING DEVICES

John R. Miles, Des Plaines, Ill., assignor to Chicago Aerial Survey Company, Chicago, Ill., a corporation of Illinois Application September 10, 1949, Serial No. 114,965

1 Claim. (Cl. 88—39)

The present invention relates to optical systems, and more particularly to optical systems for binocular viewing devices.

In the manufacture of binocular viewing devices, it is desirable to have the viewing devices built so that they are convenient to use, and so that the observer is quite comfortable, while using the device. The present invention is built so that the observer sees a clear, undistorted view at a distance of at least ten inches from the device, giving an accommodation of not over three diopters, and is preferably built with this distance equal to twenty inches or thirty inches, so that the observer does not have the eye strain which is associated with observing through small openings or eye-pieces close to the eyes. When the observer, using binocular vision, is ten inches or more from the device, and the field which he sees is about the same size as, or greater than, the separation of his eyes, it is necessary to have a single opening or eye piece, through which the observer may view the object. This is due to the fact that two eye pieces of this size, separated by the distance between the two eyes, would overlap and produce confusion and double images in the area in which they overlap. A good example of a single eye lens is the common reading glass, which is used at a reasonable distance from the eyes in most cases. Binocular viewing devices involving additional lenses for re-forming the image must be arranged so that the light from these additional lenses is directed into the region of the two eyes; otherwise, the observer will not see the image intended. This must be accomplished equally for all parts of the field of view, in order to have even illumination for all parts of this field. This region into which the light must be directed is called the exit pupil of the system, and, in the case of the present invention, two reasonably small exit pupils are provided for the observer's eyes, rather than the usual single exit pupil, which single exit pupil must be quite large in order to contain both eyes.

One of the objects of the present invention is to provide an optical system for binocular viewing devices, having a very long eye relief and using a single objective lens unit. Another object is to provide an optical system for binocular viewing devices using a single outside lens, or eye lens, and having two optical axes and two exit pupils at the eye positions, having the two eyes of the observer approximately located on, or near, said two optical axes, when only one objective lens unit is used. Another object is to provide an eyelens-erector combination, involving a beam-splitting prism or mirror, which divides the central light bundle into two light bundles, so that two optical axes and two exit pupils are provided for the two eyes of the observer used in binocular vision, with said combination functioning with a substantial eye relief and substantial field of view.

The above, and other objects and advantages of the present invention, will appear more fully hereinafter from a consideration of the detailed description and claim which follow, taken together with the accompanying drawing, wherein one embodiment of the invention is illustrated. It is to be expressly understood, however, that the drawing is for the purpose of illustration only, and is not designed as a definition of the limits of the invention. Reference for this latter purpose should be had to the appended claim.

In the drawing wherein like reference characters refer to like parts,

The figure shows a cross-sectional view taken through the two eyes of the observer and through the principal optical axis of the optical system constructed in accordance with one form of the present invention. Referring to the drawing for a more detailed description of the present invention, the light coming from the object, or from the image formed by the objective of the viewing device along axis O, strikes the first lens A, and is collimated into approximate parallel light, and then strikes prism $P_2$. This approximately parallel light proceeds through prism $P_2$ until it strikes the partially reflective coating R between prism $P_2$ and prism $P_1$, and is then divided by this partially reflective coating R, so that an equal amount of the said approximately parallel light passes on through prism $P_1$, and an equal amount of said approximately parallel light is reflected into prism $P_3$. The transmitted portion of said approximately parallel light continues through prism $P_1$ and strikes lens $B_1$, which brings this light to focus approximately in the plane of eye lens C. The reflected portion of said approximately parallel light from surface R is totally reflected by the reflecting surface of $P_3$ so that it passes on to lens $B_2$, which focuses this light also approximately in the plane of eye lens C.

The partially reflective surface R and the reflecting surface of prism $P_3$, are so arranged that the two images formed by lenses $B_1$ and $B_2$ are co-incident, as they are formed in approximately the plane of eye lens C. The light, from both lens $B_1$ and lens $B_2$, then passes on through eye lens C towards the two eyes of the observer located at E on the drawing, which are a substantial distance S from the eye lens C. Eye lens C serves as a collective lens which forms an image of lens $B_1$, located around one eye, and forms an image of lens $B_2$ located around the other eye. The eyes of the observer are accommodated and converged, so that each eye of the observer sees an identical image approximately in the plane of eye lens C, but one eye of the observer sees this image by means of lens $B_1$ and the other eye of the observer sees this image by means of lens $B_2$, that is, one eye of the observer uses the light from lens $B_1$, and the other eye of the observer uses the light from lens $B_2$. The distance S of the eyes of the observer from the eye lens C is sufficiently great so that the accommodation and convergence are approximately the same as for reading of instruments and the like.

Heretofore, in the manufacture of binocular viewing devices using single eye lens optical systems, a construction was used which employed a single pupil, and the system was made to function for binocular vision by having the size of the pupil large enough so that it would include both eyes of the observer or two objective lens units were employed to produce two exit pupils at or near the observer's eyes. In the case of the single exit pupil systems, this meant that neither eye of the observer was axially located in the bundle, and, consequently, each eye of the observer saw a different aspect of the same image, and, therefore, differential aberrations became objectionable in many cases when the field of view was sufficiently large. In the present invention, the use of two exit pupils, located approximately at the eyes of the observer, and the use of two optical axes, which are projections of the principal optical axis of the system, passing approximately through the two eyes of the observer, make it possible to substantially eliminate the differential aberrations, since, although the eyes of the observer are not at all times located precisely on the two projections of the principal optical axis, the two eyes of the observer lie in equivalently the same portions of the objective aperture, and bear the same relationship to the principal optical axis. This prior construction, using a single pupil, when used for binocular vision, also involved a very large objective and/or erector system. In the one embodiment of the present invention shown, small erectors are used in conjunction with a beam-splitting cube, or the like, and two axes and two pupils are obtained which are used by the two eyes of the observer, and binocular vision is obtained through the use of these two pupils. Each eye is thus equivalently located on, or near, the axis of the objective, and/or erector systems, which thus eliminates all differential aberrations which exist when the eyes are not equivalently located on, or near, the axis of the objective and/or erector systems.

The present invention may also be used for microscope and inspection use and the like, and the objects to be observed may be placed at the front focus of lens A. The present invention may also use other arrangements of lenses and refletors to provide the two pupils with both eyes approximately located on the two projections of the principal axis. The focal lengths of lenses $B_1$ and $B_2$ are approximately equal to the distance from lens C to either lens $B_1$ or lens $B_2$. The focal length of the lens C is such that the image of the optical centers of lenses $B_1$ and $B_2$ fall approximately on the two eyes of the observer.

What is claimed is:

A binocular optical system for use in binocular viewing devices such as binocular periscopes or the like, comprising a single entrance lens, a single eye lens unit, a partially transmitting plane reflector disposed on the principal optical axis of said system at an angle of approximately 45° to said axis, a substantially non-transmitting plane reflector disposed adjacent to said partially transmitting reflector, tilted at a small angle thereto so that the optical axis reflected, firstly, from said partially transmitting reflector, and secondly, from said substantially non-transmitting reflector, passes through the equavalent center of said single eye lens unit, said entrance lens being adapted to collimate the light striking the said two plane reflectors, and two lenses of equal focal length arranged adjacent to said two plane reflectors between said two plane reflectors and said single eye lens unit, the focal length of said two equal focal length lenses being equal substantially to their common distance from said single eye lens unit.

JOHN R. MILES.

References Cited in the file of this patent

UNITED STATES PATENTS

| Number | Name | Date |
|---|---|---|
| 739,182 | Ives | Sept. 15, 1903 |
| 1,114,232 | Cheron | Oct. 20, 1914 |
| 1,564,418 | Konig | Dec. 8, 1925 |
| 1,629,974 | Russo | May 24, 1927 |
| 1,932,029 | Wright | Oct. 24, 1933 |
| 2,185,847 | Harrison et al. | Jan. 2, 1940 |
| 2,189,298 | Rantsch | Feb. 6, 1940 |
| 2,391,675 | Brown | Dec. 25, 1945 |
| 2,517,170 | Bernard | Aug. 1, 1950 |
| 2,537,962 | Brown | Jan. 16, 1951 |

FOREIGN PATENTS

| Number | Country | Date |
|---|---|---|
| 153,325 | Great Britain | Nov. 3, 1920 |
| 87,589 | Switzerland | Dec. 16, 1920 |
| 716,632 | France | Oct. 12, 1931 |